(12) United States Patent
Haugh

(10) Patent No.: US 8,135,499 B2
(45) Date of Patent: Mar. 13, 2012

(54) LOAD SHEDDING OF A SELECTED SUBSTATION BY AN ELECTRIC UTILITY

(75) Inventor: Julianne F. Haugh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 423 days.

(21) Appl. No.: 12/498,624

(22) Filed: Jul. 7, 2009

(65) Prior Publication Data

US 2011/0010018 A1 Jan. 13, 2011

(51) Int. Cl.
*H02J 3/14* (2006.01)
(52) U.S. Cl. .......................................... 700/295; 307/39
(58) Field of Classification Search .................. 700/287, 700/295, 297; 307/38, 39
See application file for complete search history.

(56) References Cited

U.S. PATENT DOCUMENTS

| | | | |
|---|---|---|---|
| 4,620,283 A * | 10/1986 | Butt et al. ...................... | 700/295 |
| 7,274,974 B2 | 9/2007 | Brown et al. | |
| 2008/0167756 A1 * | 7/2008 | Golden et al. ................. | 700/297 |
| 2009/0187499 A1 * | 7/2009 | Mulder et al. ................. | 705/30 |
| 2010/0145542 A1 * | 6/2010 | Chapel et al. ................. | 700/295 |
| 2010/0145884 A1 * | 6/2010 | Paik .............................. | 705/412 |
| 2010/0250014 A1 * | 9/2010 | Taft ............................... | 700/291 |

* cited by examiner

*Primary Examiner* — Ryan Jarrett
(74) *Attorney, Agent, or Firm* — Brevetto Law Group

(57) ABSTRACT

Load shedding by an electric utility, including querying power distribution systems that include a DRG system for present power consumption of the local load of the power distribution system; selecting, in dependence upon the present power consumption of the local load of the power distribution systems and predefined power consumption criteria for each substation, a substation to receive a reduction in power; and reducing power provided to the selected substation.

12 Claims, 5 Drawing Sheets

LOAD SHEDDING OF A SELECTED SUBSTATION BY AN ELECTRIC UTILITY

BACKGROUND OF THE INVENTION

1. Field of the Invention

The field of the invention is data processing, or, more specifically, methods, apparatus, and products for load shedding.

2. Description of Related Art

From time to time, electric grid demand exceeds supply capabilities of an electric utility. When confronted with such a situation, electric utilities may allow system voltage to decline—a brownout—or shed loads—a blackout. If the amount required to be produced for a brownout exceeds the electric utility's reserve capacity, the excess demand is greater than what could be tolerated by implementing a brownout and load shedding must occur. Present methods of selecting portions of the electric grid to blackout ignore actual present power consumption by their electricity consumers. In fact, until recently granular knowledge of power consumption by electricity consumers was not possible. Today, however, distributed renewable generation systems, such as micro-hydroelectric, photovoltaic, and wind turbine systems, often implement machinery capable of data communications with the electric utility.

SUMMARY OF THE INVENTION

Methods, apparatus, and products for load shedding by an electric utility are disclosed in which the electric utility is capable of providing electricity to one or more power distribution systems organized into one or more substations, at least one power distribution system in at least one substation includes a distributed renewable generation ('DRG') system, the DRG system is capable of providing power to the electric utility, a local load, and one or more batteries for storage, and each power distribution system is connected for data communications through a data communications network to the electric utility. Load shedding according to embodiments of the present invention includes: querying, by the electric utility, power distribution systems that include a DRG system for present power consumption of the local load of the power distribution system; selecting, in dependence upon the present power consumption of the local load of the power distribution systems and predefined power consumption criteria for each substation, a substation to receive a reduction in power; and reducing power provided to the selected substation.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
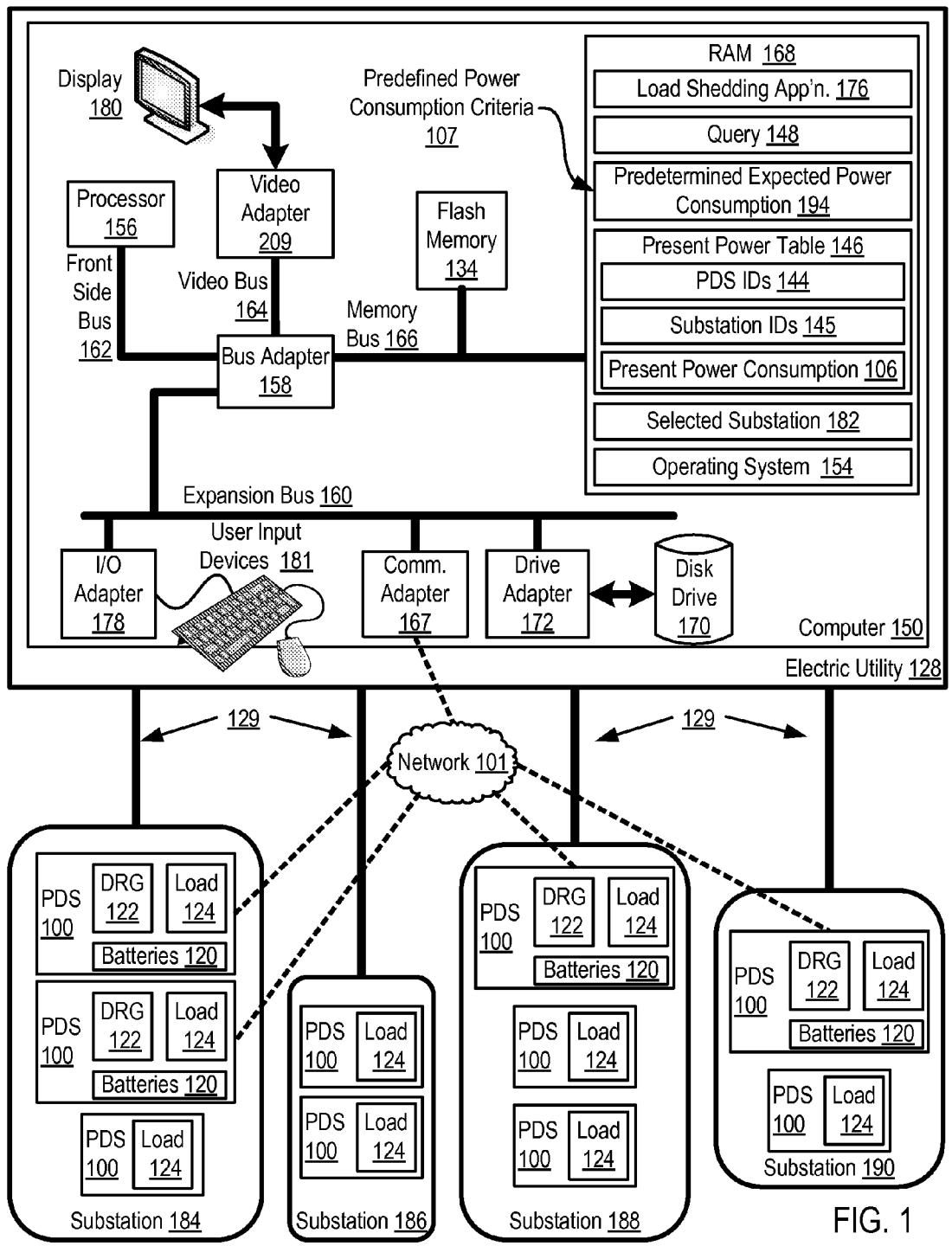
FIG. 1 sets forth a block diagram of an exemplary system for load shedding according to embodiments of the present invention.

Exemplary methods, apparatus, and products for load shedding in accordance with the present invention are described with reference to the accompanying drawings, beginning with FIG. 1. FIG. 1 sets forth a block diagram of an exemplary system for load shedding according to embodiments of the present invention. Load shedding as the term is used here refers to the process carried out by an electric utility in which the electric utility reduces or eliminates power supply to one or more electrical loads. Such load shedding typically occurs when demand for present demand for electricity exceeds possible supply by the electric utility. A load that is shed is said to experience a 'blackout.'

The exemplary load shedding system of FIG. 1 includes an electric utility (128) that is capable of providing electricity to power distribution systems (100) organized in one of several substations (184, 186, 188, 190). The electric utility (128) provides power to the substations through electricity mains (129). Only one power line connection per substation is depicted in the example of FIG. 1 for clarity, not limitation. Readers of skill in the art will immediately recognize that other devices, machinery, switches, transformers, power lines, power substations, and other power distribution technology may be implemented in the exemplary system of FIG. 1 to enable the electric utility (128) to provide power to the power substations. The term electric utility (128) may refer, as context requires, to the electric distribution utility as such or to automated computing machinery that carries out load shedding according to embodiments of the present invention.

A substation as the term is used here is a collection of one or more power distribution systems. A power distribution system, depicted in the example system of FIG. 1 as a PDS (100), is a collection of computer hardware, computer software, machinery, and other components that distributes power from one or more sources to one or more loads. Some power distribution systems include a distributed renewable generation ('DRG') system, while other power distribution systems do not. DRG systems are power generation technologies that provide an alternative to or an enhancement of traditional electric utility power systems. DRG systems are described as 'renewable' when resources used to generate power in the system are renewable resources such as wind, solar power, and water. Examples of DRG systems useful in power distribution systems that participate in load shedding according to embodiments of the present invention include photovoltaic ('PV') systems, micro-hydroelectric systems, and wind turbine systems.

Substations useful in systems that perform load shedding in accordance with embodiments of the present invention may include any combination of types of power distribution systems: those with a DRG and those without. In the example system of FIG. 1, substation (184) includes three power distribution systems: two which include a DRG system (122) and one which does not. Substation (186) includes two power distribution system, neither of which includes a DRG system (122). Substation (188) in the example of FIG. 1 includes three power distribution systems: one with a DRG system (122) and two without. Substation (190) includes two power distribution systems, one with a DRG system (122) and one without. Readers of skill in the art will immediately recognize that substations useful in systems that perform load shedding in accordance with embodiments of the present invention may include any number of power distribution systems, much more in fact, than two or three depicted here for clarity of explanation. Each DRG system (122) in the example of FIG. 1, is capable of providing power to the electric utility (128), to a local load (124), and to one or more batteries (120) for storage.

The electric utility (128) includes automated computing machinery comprising an exemplary computer (150) useful in load shedding according to embodiments of the present invention. The computer (150) of FIG. 1 includes at least one computer processor (156) or 'CPU' as well as random access memory (168) ('RAM') which is connected through a high speed memory bus (166) and bus adapter (158) to processor (156) and to other components of the computer (150).

Stored in RAM (168) is a load shedding application (176), a module of computer program instructions that when executed controls operation of the computer (150) for load shedding according to embodiments of the present invention. That is, the electric utility (128) carries out load shedding according to embodiments of the present invention through use of automated computing machinery, the aggregation of the load shedding application (176) and the computer (150). The load shedding application may carry out load shedding according to embodiments of the present invention by querying power distribution systems (184, 188, 190) that include a DRG system (122) for present power consumption (106) of the local load (124) of the power distribution system (184, 188, 190); selecting, in dependence upon the present power consumption (106) of the local load of the power distribution systems (100) and predefined power consumption criteria (107) for each substation (184, 188, 190), a substation (182) to receive a reduction in power; and reducing power provided to the selected substation (182).

The load shedding application (176) may store results of the queries (148) sent to the power distribution systems (184, 188, 190) that include a DRG system (122) in a data structure, such as the example present power consumption table (146) of FIG. 1. The present power consumption table (146) may include records that associate a substation identifier (144), a power distribution system identifier (145) and a power distribution system's present power consumption (106).

The load shedding application (176) may select a substation (182), in dependence upon predefined power consumption criteria, to receive a reduction in power in various ways. Predefined power consumption criteria may refer to measures and rules governing the selection of a substation to receive a reduction in power. In the example of FIG. 1, the predefined power consumption criteria (107) not only specifies measures used to govern the selection as predetermined expected power consumption for each substation, and specifies the rules governing selection. The rules in the example of FIG. 1 specify that the load shedding application may select a substation to receive a reduction in power by: averaging, for each substation (300), the present power consumption (106) of the local loads (124), calculating (314), for each substation (300) having an average present power consumption (324) greater than a predetermined expected power consumption (194) for that substation, a difference (318) between the average present power consumption (324) and the predetermined expected power consumption (194); and identifying (316), as the substation (320) to receive the reduction in power, a substation (300) having the greatest difference (318) between the average present power consumption (324) and the predetermined expected power consumption (194).

Also stored in RAM (168) is an operating system (154). Operating systems useful load shedding according to embodiments of the present invention include UNIX™, Linux™, Microsoft XP™, AIX™, IBM's i5/OS™, and others as will occur to those of skill in the art. The operating system (154), load shedding application (176), present power consumption table (194), and so on in the example of FIG. 1 are shown in RAM (168), but many components of such software typically are stored in non-volatile memory also, such as, for example, on a disk drive (170).

The computer (150) of FIG. 1 includes disk drive adapter (172) coupled through expansion bus (160) and bus adapter (158) to processor (156) and other components of the computer (150). Disk drive adapter (172) connects non-volatile data storage to the computer (150) in the form of disk drive (170). Disk drive adapters useful in computers for load shedding according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory ('EEPROM'), Flash memory (142), RAM drives, and so on, as will occur to those of skill in the art.

The example computer (150) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (150) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (150) of FIG. 1 includes a communications adapter (167) for data communications with other computers and for data communications with a data communications network (101). In the example of FIG. 1, the electric utility (128) is connected through the computer (150) and communications adapter (167) to each power distribution system (100) that includes a DRG system (122) through the data communications network (101). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for load shedding according to embodiments of the present invention include modems for wired dial-up communications, Ethernet (IEEE 802.3) adapters for wired data communications network communications, and 802.11 adapters for wireless data communications network communications.

The arrangement of computers, power distribution systems, and networks making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
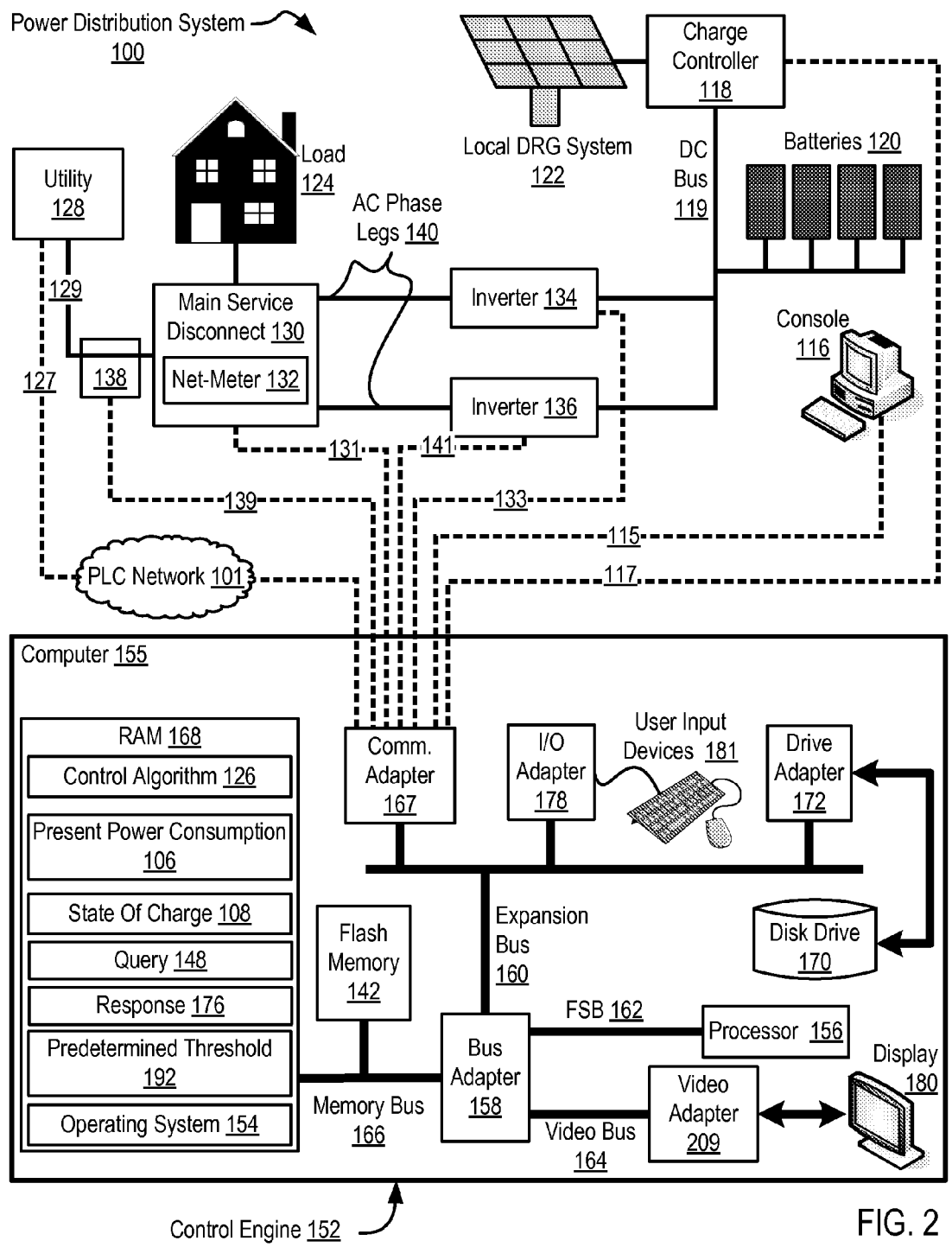
FIG. 2 depicts an exemplary power distribution system that includes a local DRG system and also participates in electric utility load shedding according to embodiments of the present invention.

As mentioned above, load shedding according to embodiments of the present invention occurs by querying power distribution systems that include a DRG system. For further explanation, therefore, FIG. 2 depicts an exemplary power distribution system that includes a local DRG system and also participates in electric utility load shedding according to embodiments of the present invention. The example power distribution system (100) of FIG. 2 receives power from the electric utility (128) and includes a distributed renewable generation ('DRG') system (122). The DRG system (122) of FIG. 2 provides power to the electric utility (128), a local load (124), and one or more batteries (120) for storage.

The example DRG system (112) in FIG. 2 is depicted as a 'local' DRG system, so described because the DRG system is maintained and operated by and for the benefit of the owner of the power distribution system in contrast to DRG systems located and operated by other entities. 'Local' here may also mean that the DRG system is physically located near the load to which the DRG system provides power, but such a limitation on location is not necessary. That is, a local DRG systems in a power distribution system that participates in load shedding in accordance with embodiments of the present invention may be physically located near the load to which the DRG system provides power or not.

DRG systems that provide power to an electric utility do so according to a net-metering policy. A net-metering policy is an electricity policy that specifies that a DRG system owner receives, from a utility, one or more credits for at least a portion of electricity generated by the DRG system and provided to the utility. That is, a utility pays a DRG system owner for electricity received by the utility and generated by the owner's DRG system. In prior art, such 'payment' is carried out by literally spinning an electricity meter backwards for power generated by a DRG system and provided to the utility. Such bi-directional meters are referred to as net-meters (132).

Installed as part of the main service disconnect (132) is a net-meter (132). Readers of skill in the art will recognize that inclusion of the net-meter as part of the main service disconnect (130) is for purposes of clarity not limitation, a net-meter used in accordance with embodiments of the present invention may be configured as a stand alone device, a component separate and apart from the main service disconnect. A net-meter is device that meters net-electricity distributed through the main service disconnect to the load. The term 'net' here refers to the difference in power provided to the load (124) from the utility and locally generated power provided to the load and provided to the utility along power line (129). Locally generated power as the term is used in this specification refers, as context requires, to any power generated by a local DRG system (122) in a power distribution system (100), whether that power is currently generated and not stored or the power was previously generated and stored in the batteries.

The power distribution system in the example of FIG. 2 distributes power to a local load (124). A local load (124) is an electrical load, a consumer of power. The local load (124) in the example of FIG. 2 receives operational power, typically AC power, through the main service disconnect (130). A main service disconnect is a switch that when open, disconnects the load (124) from power provided by the utility (128). Although not shown here for clarity, readers of skill in the art will recognize that other electrical distribution components may be connected to the main service disconnect (130) for distributing power to the load (124) such as line conditioners, circuit breakers, and the like. The main service disconnect in the example of FIG. 2 may be provided power to distribute to the load (124) from one or more sources: an electric utility (128) through power line (129) and the local DRG system (122) through the charge controller (118), Direct Current ('DC') bus (119), power inverters (134, 136), and phase legs (140).

A charge controller (118) is a device that limits the rate at which electric current generated by the local DRG system (122) is added to or drawn from electric batteries along the DC bus (119). The example charge controller (118) is configured to monitor the battery's present state of charge. The term 'state of charge' as used in this specification may refer to either or both of a relative state of charge with respect to total battery capacity, such as 90% charged, or a present battery capacity, such as 24 KW of a 26.7 KW battery, as context requires.

The power inverters (134, 136) are configured to convert DC power into AC power. The inverters in the example of FIG. 2 are grid-tie inverters: inverters that monitor AC supply waveforms from the utility (128) along power line (129), also referred to as 'mains,' and invert DC power from the local DRG system to AC power in phase with the AC supply for supply to a load (124) and the utility (128). The example power inverters (134, 136) of FIG. 2 are configured to sense AC production along the phase legs.

The example system (100) of FIG. 2 also includes a control engine (152). A control engine (152) is a module of automated computing machinery that participates in load shedding in accordance with embodiments of the present invention. That is, a control engine (152) may be implemented as an aggregation of computer hardware and software. In the example of FIG. 2, the control module (152) is implemented as a computer (155), similar to the computer of FIG. 1 in that the computer (155) of FIG. 2, includes a computer processor (156), RAM (168), a high speed memory bus (166), bus adapter (158), flash memory (142), expansion bus (160), a front side bus (162), a video adapter (209), a display (180), a communications adapter (167), an I/O adapter (178), I/O devices (181), drive adapters (172), disk drive (170), and so on.

The exemplary computer (155) of FIG. 2 is connected through the communications adapter (167) for data communications with other computers, with a data communications network, the PLC network (101), and with the following devices:

the electric utility (128) connected through the PLC network (101) and data communications connection (127) to the computer (155);
  the main service disconnect (130) through data communications connection (131);
  the inverter (136) through data communications connection (141);
  the inverter (134) through data communications connection (133);
  the console (116) through data communications connection (115);
  the charge controller (118) through data communications connection (117);

and the current sensor (138) through data communications connection (139).

The example power distribution system (100) of FIG. 2 connected for data communications through a power line communications ('PLC') network (101). PLC, also known as Power line Digital Subscriber Line (PDSL), mains communication, power line telecom (PLT), or power line networking (PLN), is a system for carrying data on a conductor also used for electric power transmission. Broadband over Power Lines (BPL) uses PLC by sending and receiving information bearing signals over power lines to provide access to the Internet. Electrical power is transmitted over high voltage transmission lines, distributed over medium voltage, and used inside buildings at lower voltages. Power line communications can be applied at each stage. Most PLC technologies limit themselves to one set of wires such as, for example, premises wiring, but some can cross between two levels such as, for example, both the distribution network and premises wiring. Power line communications systems operate by impressing a modulated carrier signal on the wiring system. Different types of power line communications use different frequency bands, depending on the signal transmission characteristics of the power wiring used.

Stored in RAM (168) of the computer (155) is a control algorithm, a module of computer program instructions that when executed operates the computer (155) as a control engine (152) for participating in load shedding in accordance with embodiments of the present invention. The control algorithm (126) may participate in load shedding according to embodiments of the present invention by: receiving from the electric utility (128) a query (148) for present power consumption (106) of the local load (124) of the power distribution system (100); determining whether a present state of charge (108) of the batteries (120) of the power distribution system (100) is greater than a predetermined threshold (109); and responding to the electric utility's (128) query (148) with the present power consumption (106) of the local load only if the present state of charge of the one or more batteries of the power distribution system is greater than the predetermined threshold.

In substations of the current art, very few power distribution systems include DRG systems. In fact, few substations at present likely have any power distribution system that include a DRG system at all and as such, have no capability of receiving or responding to a query from the electric utility. If the power distribution system (100) of FIG. 2 does not respond to the query (148), then it is unlikely that any other power distribution system in the same substation is capable of providing a response to the electric utility. Further, at present, the query itself indicates, from the perspective of the power distribution system, that the electric utility is considering shedding a load. Without a response from a substation, the electric utility is unlikely to select that substation to receive a reduction in power. As such, the power distribution system (100) in the system of FIG. 2 responds to the query (148) only if the present state of charge of the batteries (120) is such that the power distribution system (100) can withstand a blackout. Otherwise, the power distribution system ignores the query and increases its chances of remaining at full power.

Figure 3:
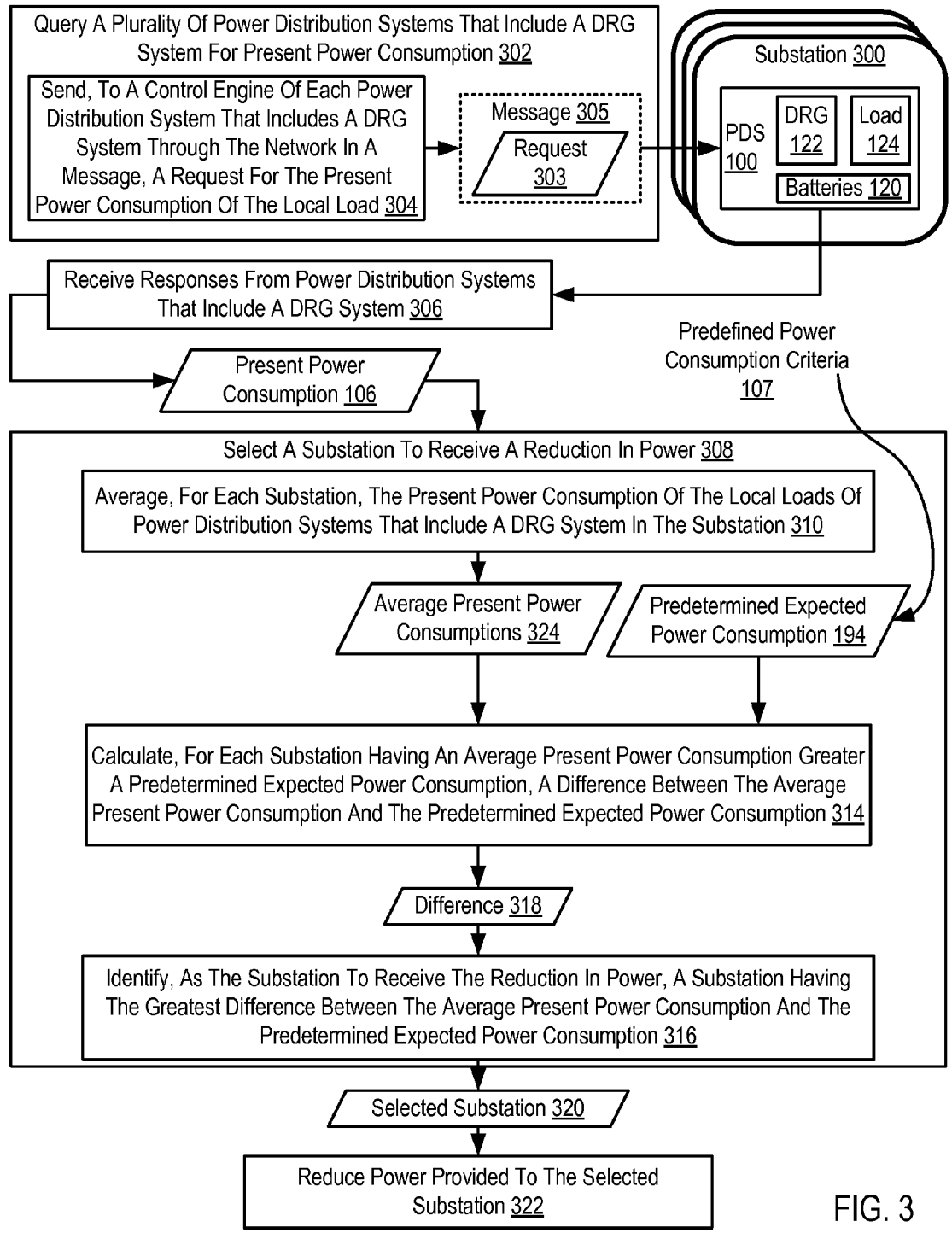
FIG. 3 sets forth a flow chart illustrating an exemplary method for load shedding according to embodiments of the present invention.

For further explanation, FIG. 3 sets forth a flow chart illustrating an exemplary method for load shedding according to embodiments of the present invention. The method of FIG. 3 is carried out by an electric utility similar to the electric utility (128) depicted in the example of FIG. 1, through use of automated computing machinery, such as the computer (150) and load shedding application (176) depicted in the example of FIG. 1. The electric utility (128 on FIG. 1) is capable of providing electricity to one or more power distribution systems (100) organized into one or more substations (300). At least one of the power distribution systems (100) in at least one substation (300) includes a distributed renewable generation ('DRG') system (122). The DRG system (122) is capable of providing power to the electric utility (128 on FIG. 1), a local load (124), and one or more batteries (120) for storage. Each power distribution system (100) is also connected for data communications through a data communications network (101 on FIG. 1) to the electric utility (128 on FIG. 1).

The method of FIG. 3 includes querying (302), by the electric utility, a number of power distribution systems that include a DRG system for present power consumption (106) of the local load (124) of the power distribution system (100). In the method of FIG. 3, querying (302) power distribution systems (100) that include a DRG system for present power consumption (106) is carried out by sending (304), by the electric utility to a control engine of each of the plurality of power distribution systems (100) that includes a DRG system (122) through the data communications network in a data communications message (305), a request (303) for the present power consumption (106) of the local load (124) of each power distribution system (100). The method of FIG. 3 also includes receiving (306) responses from the power distribution systems that include a DRG system.

The method of FIG. 3 also includes selecting (308), in dependence upon the present power consumption (106) of the local load (124) of the power distribution systems (100) and predefined power consumption criteria (107) for each substation (300), a substation (300) to receive a reduction in power. Selecting (308) a substation (300) to receive a reduction in power may be carried out by: averaging (310), for each substation (300), the present power consumption (106) of the local loads (124) of power distribution systems (100) that include a DRG system (122) in the substation (300); calculating (314), for each substation (300) having an average present power consumption (324) greater than a predetermined expected power consumption (194) for that substation, a difference (318) between the average present power consumption (324) and the predetermined expected power consumption (194); and identifying (316), as the substation (320) to receive the reduction in power, a substation (300) having the greatest difference (318) between the average present power consumption (324) and the predetermined expected power consumption (194). The substation having the greatest difference between the average present power consumption (324) and the substation's predetermined expected power consumption (194) is the so called 'worst offender'—the substation consuming more power, normalized for all substations, than any other substation.

The method of FIG. 3 also includes reducing (322) power provided to the selected substation (320). Reducing power provided to the selected substation (320) may be carried out by controlling power distribution machinery, switches, transformers, power distribution substations, and so on, to electrically disconnect the substation from the power supply.

Figure 4:
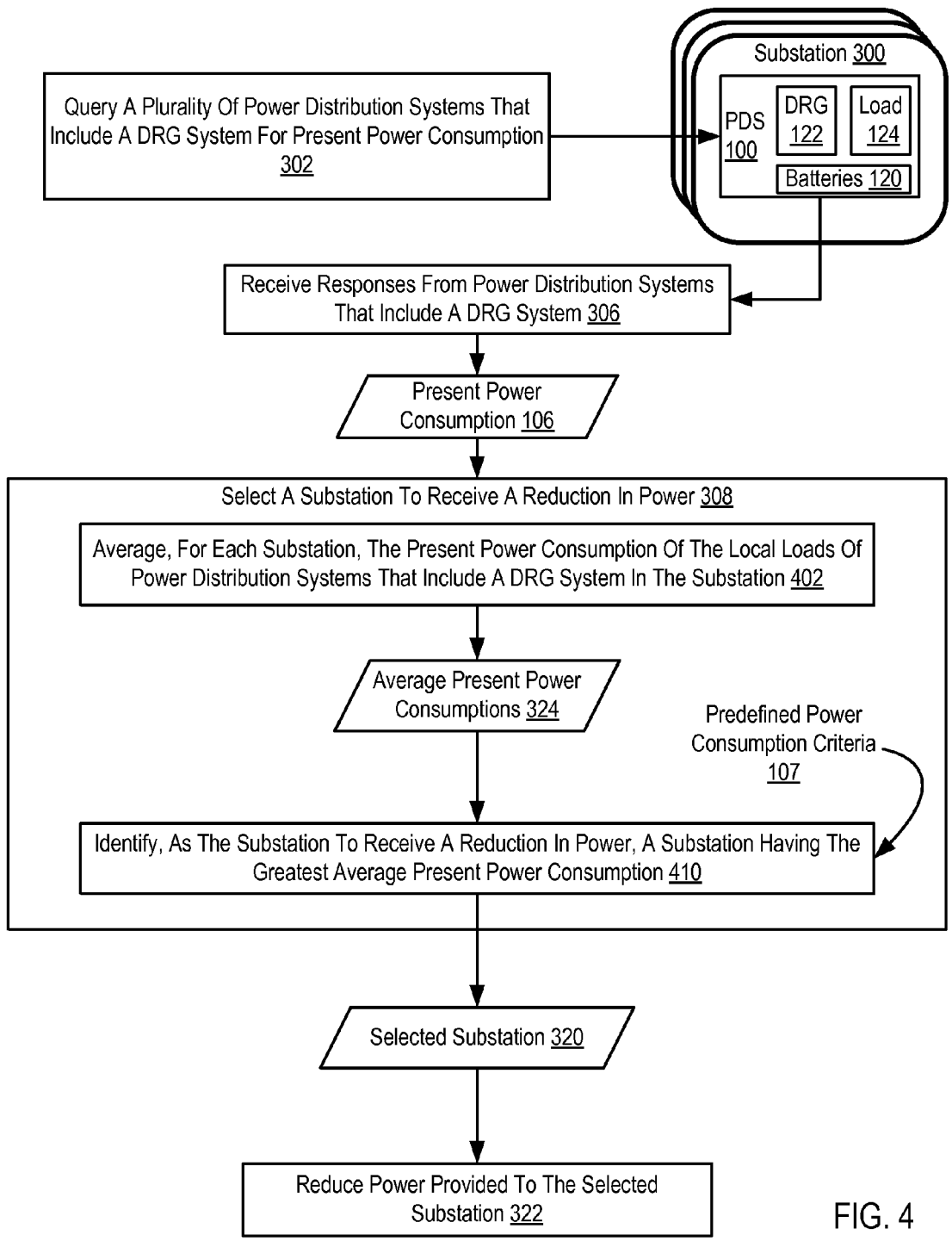
FIG. 4 sets forth a flow chart illustrating a further exemplary method for load shedding according to embodiments of the present invention.

For further explanation, FIG. 4 sets forth a flow chart illustrating a further exemplary method for load shedding according to embodiments of the present invention. The method of FIG. 4 is similar to the method of FIG. 3 including as it does querying (302) a plurality of power distribution systems that include a DRG system for present power consumption (106); selecting (308) a substation (300) to receive a reduction in power; and reducing (322) power provided to the selected substation (320).

Figure 5:
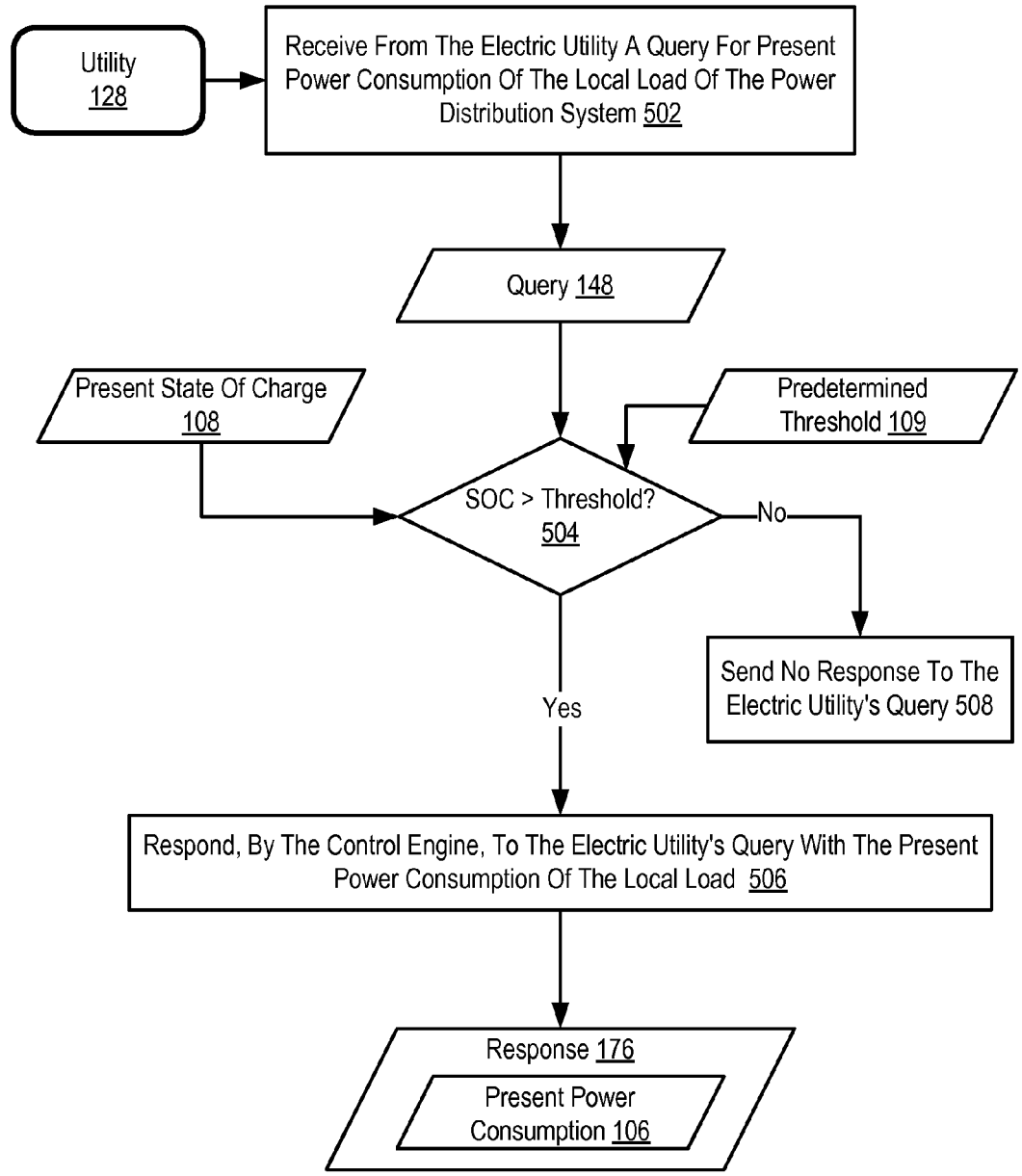
FIG. 5 sets forth a flow chart illustrating a exemplary method of participating in electrical utility load shedding according to embodiments of the present invention.

The method of FIG. 4 differs from the method of FIG. 3, however, in that in the method of FIG. 4, selecting (308) a substation (300) to receive a reduction in power is carried out by averaging (402), for each substation (300), the present power consumption (106) of the local loads (124) of power distribution systems (100) that include a DRG system (122) in the substation (300) and identifying (410), as the substation (320) to receive a reduction in power, a substation (300) having the greatest average present power consumption (324). The substation having the greatest average present power consumption (324) may not be the so-called 'worst offender,' but represents the absolute highest power consumer among all substations. In view of the explanations set forth above, readers will recognize that the benefits of load shedding according to embodiments of the present invention include:

For further explanation, FIG. 5 sets forth a flow chart illustrating a exemplary method of participating in electrical utility load shedding according to embodiments of the present invention. The method of FIG. 5 is carried out by a control engine of a power distribution system similar to the control engine (152) and power distribution system (100) depicted in the example of FIG. 2. The power distribution system (100 on FIG. 2) received electricity from an electric utility (128) and includes at a DRG system (122 on FIG. 2). The DRG system is capable of providing power to the electric utility (128), a local load (124 on FIG. 2), and one or more batteries for storage (120 on FIG. 2). The power distribution system (100 on FIG. 2) is connected for data communications through a data communications network (101 on FIG. 2) to the electric utility (128).

The method of FIG. 5 includes receiving (502) from the electric utility (128), by a control engine of a power distribution system that includes a DRG system, a query (148) for present power consumption (106) of the local load of the power distribution system. Receiving (502) a query (148) from the electric utility may be carried out by receiving the query via the data communications network in one or more data communications messages. The data communications network may be implemented in some embodiments as a PLC network.

The method of FIG. 5 also includes determining (504) whether a present state of charge (108) of the one or more batteries of the power distribution system is greater than a predetermined threshold (109). Determining (504) whether a present state of charge (108) of the one or more batteries of the power distribution system is greater than a predetermined threshold (109) may be carried out by retrieving from a charge controller, the present state of charge (108) of the batteries) and comparing the present state of charge to the predetermined threshold.

The method of FIG. 5 also includes responding (176) to the electric utility's (128) query (148) with the present power consumption (106) of the local load only if the present state of charge of the one or more batteries of the power distribution system is greater than the predetermined threshold. Responding (176) to the electric utility's (128) query may be carried out by sending, in one or more data communications messages, across the data communications network, data representing preset power consumption of the local load. If the present state of charge of the one or more batteries of the power distribution system is not greater than the predetermined threshold, the method of FIG. 5 continues by sending (508) no response to the electric utility.

Exemplary embodiments of the present invention are described largely in the context of a fully functional computer system for load shedding. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of load shedding by an electric utility, the electric utility capable of providing electricity to one or more power distribution systems organized into one or more substations, at least one power distribution system in at least one substation comprising a distributed renewable generation ('DRG') system, the DRG system capable of providing power to the electric utility, a local load, and one or more batteries for storage, each power distribution system connected for data communications through a data communications network to the electric utility, the method comprising:

querying, by the electric utility, a plurality of power distribution systems that include a DRG system for present power consumption of the local load of the power distribution system;

averaging, for each of the one or more substations, the present power consumption of the local loads of power distribution systems that include a DRG system in the substation;

calculating, for each of the one or more substations having an average present power consumption greater than a predetermined expected power consumption for that substation, a difference between the average present power consumption and the predetermined expected power consumption;

selecting, as a substation to receive a reduction in power, a substation among the one or more substations having the greatest difference between the average present power consumption and the predetermined expected power consumption; and reducing power provided to the selected substation.

2. The method of claim 1 wherein querying a plurality of power distribution systems that include a DRG system for present power consumption of the local load of the power distribution system further comprises:

sending, by the electric utility to a control engine of each of the plurality of power distribution systems that includes a DRG system through the data communications network in a data communications message, a request for the present power consumption of the local load of each power distribution system.

3. The method of claim 1 wherein the data communications network is a power line communications ('PLC') network.

4. The method of claim 1 wherein at least one DRG system comprises a photovoltaic ('PV') system.

5. The method of claim 1 wherein at least one DRG system comprises a micro-hydroelectric system.

6. The method of claim 1 wherein at least one DRG system comprises a wind turbine system.

7. An apparatus for load shedding by an electric utility, the electric utility capable of providing electricity to one or more power distribution systems organized into one or more substations, at least one power distribution system in at least one substation comprising a distributed renewable generation ('DRG') system, the DRG system capable of providing power to the electric utility, a local load, and one or more batteries for storage, each power distribution system connected for data communications through a data communications network to the electric utility, the apparatus comprising a computer processor, a computer memory operatively coupled to the computer processor, the computer memory having disposed within it computer program instructions capable of:

querying, by the electric utility, a plurality of power distribution systems that include a DRG system for present power consumption of the local load of the power distribution system;

averaging, for each of the one or more substations, the present power consumption of the local loads of power distribution systems that include a DRG system in the substation;

calculating, for each of the one or more substations having an average present power consumption greater than a predetermined expected power consumption for that substation, a difference between the average present power consumption and the predetermined expected power consumption;

selecting, as a substation to receive a reduction in power, a substation among the one or more substations having the greatest difference between the average present power consumption and the predetermined expected power consumption; and reducing power provided to the selected substation.

8. The apparatus of claim 7 wherein querying a plurality of power distribution systems that include a DRG system for present power consumption of the local load of the power distribution system further comprises:

sending, by the electric utility to a control engine of each of the plurality of power distribution systems that includes a DRG system through the data communications network in a data communications message, a request for the present power consumption of the local load of each power distribution system.

9. The apparatus of claim 7 wherein the data communications network is a power line communications ('PLC') network.

10. The apparatus of claim 7 wherein at least one DRG system comprises a photovoltaic ('PV') system.

11. The apparatus of claim 7 wherein at least one DRG system comprises a micro-hydroelectric system.

12. The apparatus of claim 7 wherein at least one DRG system comprises a wind turbine system.

\* \* \* \* \*